N. MININBERG.
FLAKED FOOD PRODUCT AND PROCESS OF PRODUCING THE SAME.
APPLICATION FILED APR. 23, 1921.
1,411,641.
Patented Apr. 4, 1922.
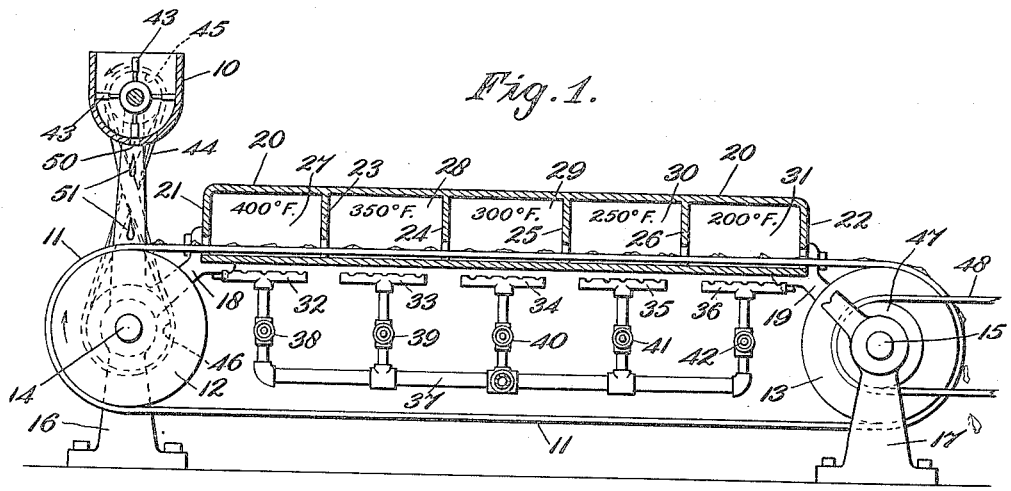
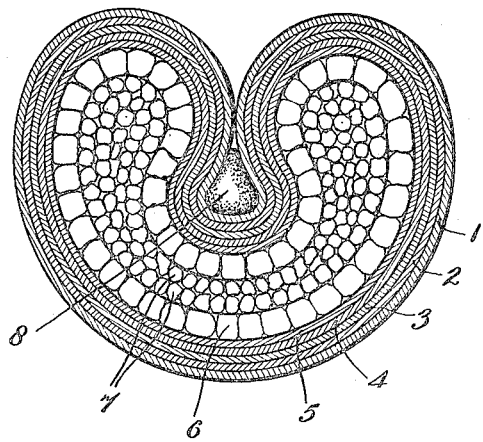
Inventor
Nathan Mininberg,
By T. G. Witherspoon
Attorney

UNITED STATES PATENT OFFICE.

NATHAN MININBERG, OF DICKINSON, NORTH DAKOTA, ASSIGNOR TO BRAN PRODUCTS COMPANY, OF DICKINSON, NORTH DAKOTA, A CORPORATION OF NORTH DAKOTA.

FLAKED FOOD PRODUCT AND PROCESS OF PRODUCING THE SAME.

1,411,641.      Specification of Letters Patent.      Patented Apr. 4, 1922.

Application filed April 23, 1921. Serial No. 463,957.

*To all whom it may concern:*

Be it known that I, NATHAN MININBERG, a citizen of the United States, residing at Dickinson, in the county of Stark and State of North Dakota, have invented certain new and useful Improvements in Flaked Food Products and Processes of Producing the Same; and I do hereby declare the following to be a full, clear, and exact description of the invention, such as will enable others skilled in the art to which it appertains to make and use the same.

This invention relates to food products and processes of producing the same, and has for its object to produce a new food which will be beneficial and nutritious, as well as a process of preparing the same which will be simple and relatively inexpensive to carry out.

With these and other objects in view, the invention consists in the novel steps and combinations of steps constituting the process, and in the novel food product resulting therefrom, all as will more fully appear below and will be particularly pointed out in the claims.

Referring to the accompanying drawings forming a part of this specification:

Figure 1 is a diagrammatic, longitudinal sectional view partly in elevation, of a portion of an apparatus suitable for carrying out the present process and in producing the new food product; and Figure 2 is an enlarged diagrammatic sectional view of a wheat grain or kernel.

It has been heretofore proposed to provide food products in the form of flakes composed of various portions of the kernels of certain cereals, such as wheat, which are known on the market today under various trade names, such as "Bran Crumbles", etc. The wheat kernel appears under the microscope substantially as shown in Figure 2 in the drawings; wherein 1 indicates the outer coating or layer usually termed "bran," under which are the layers or coatings 2 and 3, containing nitrogenous material, as well as certain salts of phosphorus and potassium. Beneath these outer coatings or layers are the layers 4 and 5 composed of a cerealine substance which imparts coloring and flavor to the kernel.

The layer 6 is composed principally of gluten, while the layer 7 is for the most part made up of starchy materials. 8 indicates the germ of the wheat kernel containing the easily soluble organic salts that supply vitality and first nourishment to the embryo plant. In the making of white flour, the layers 1, 2, 3, 4, 5, and 6, as well as the germ 8, are removed and discarded, leaving substantially only the starchy portion of the kernel indicated by the numeral 7, while in the preparation of all of the so called bran foods with which I am familiar, only the outer layer 1 is employed. In the preparation of the food constituting the present invention, however, I utilize not only the outer bran layer 1, but also the layers 2 and 3 containing the nitrogenous matters and the salts of phosphorus and potassium, which latter to my knowledge have not been heretofore utilized in this connection.

The materials of these layers 1, 2 and 3 separated from the other layers of the grain, are readily obtainable at large flouring mills throughout the country.

In carrying out the present process of producing this new food, I preferably bring, say, 100 parts of water to the boiling point, whereupon I deposit therein say 12 parts of raw bran material, composed of the three outer layers of the wheat kernel as above indicated, being careful to continually stir the water while the bran is being deposited therein in order that each individual particle will be thoroughly saturated and boiled. The stirring and boiling of the mixture is continued until approximately 25% of the water has been absorbed and boiled off, which will require a period of less than five minutes, and it will produce a batter having the consistency of a thick cream, care being taken all the while to prevent the mixture from working into a solid mass.

As soon as this condition is reached the boiling is stopped and the mass is cooled to a temperature not less than 100° F. and not exceeding 110° F., the stirring action being continued all the while to avoid the tendency of the exterior of the mass to become cooled while the interior remains hot, as such a condition will tend to separate the bran. As soon as the cooling step has been completed and the entire mass has been brought to a temperature within the limits above mentioned, it may be seasoned as by adding a suitable quantity of sugar, salt, spices, or the like, in order to impart any desired flavor to the finished product.

The material is now in the form of a relatively thin batter and is in a condition to be flaked. In order to accomplish flaking, the material should not be baked, but should pass through a drying process, such for example as may be carried out in the apparatus illustrated in Figure 1 of the present drawings. That is to say, the batter, is preferably introduced into a hopper 10 associated with a traveling metal belt 11 mounted upon a pair of pulleys or drums 12 and 13 suitably journalled upon shafts 14 and 15 respectively carried in suitable standards 16 and 17. Said standards 16 and 17 may be provided with the extensions 18 and 19 supporting the housing 20, provided with the end members 21 and 22 as well as with the substantially vertical baffles or dividing walls 23, 24, 25 and 26, as shown. These said baffles divide the housing member 20 into a plurality of chambers 27, 28, 29, 30 and 31, each of which may be individually heated in any suitable manner, as by the gas burners 32, 33, 34, 35 and 36. The said heating members may be supplied from a common pipe 37, and they may be controlled as by the valve members 38, 39, 40, 41 and 42 respectively.

The hopper member 10 is preferably provided with a revolving agitating device 43 which may be driven in any suitable manner, as by the belt 44 passing around the pulley 45 on the shaft on which said agitating device is mounted and around the pulley 46 carried by the shaft 14. The shaft 15 may likewise be provided with a pulley member 47 around which passes the belt 48 driven from any suitable source of power, not shown, whereby power may be supplied to the entire mechanism. The hopper member 10 is provided with a plurality of feed openings 50, from which the batter is adapted to be fed in drops, such as 51, to the traveling belt 11, as will be clear from Fig. 1.

The burner members 32, 33, 34, 35 and 36 are preferably so controlled by means of their valves 38, 39, 40, 41 and 42 that the temperature within the chamber 27 is maintained at, say, substantially 400° F., while that in the chamber 28 is maintained at substantially 350° F.; that in the chamber 29 at substantially 300° F.; that in the chamber 30 at substantially 250° F.; and that in the chamber 31 at substantially 200° F.

It therefore results that as the drops 51 of the batter material are deposited upon the traveling belt 11 which moves in the direction indicated, by the arrow, they flatten out and are carried by the said belt into the chamber 27 where they are subjected to a temperature of, say, substantially 400° F. As they proceed toward the right, as seen in Figure 1, they successively enter the chambers 28, 29, 30, and 31, wherein they are successively subjected to decreasing temperatures as their moisture decreases. It therefore results that the moisture is dried out completely and as this occurs the drops assume a flaky condition, so that when they emerge from the chamber 31 they are very similar in appearance to many of the flaked breakfast foods now on the market. They will be discharged, of course, from the traveling belt at the right hand end of the machine, as seen in Figure 1, into any suitable container, not shown.

I have found from actual experience that the best results are obtained when the batter material is dropped upon the traveling belt 11 from a height of not less than 3 feet, whereby any air which may be entrapped is permitted to escape therefrom. Furthermore, the speed of the belt 11 is so controlled that the flakes occupy a period of from, say, 5 to 8 minutes in passing through all of the drying chambers 27, 28, 29, 30, and 31, and the whole operation including the boiling may be completed in, say, twenty minutes.

After leaving the traveling belt 11, the flakes may, if desired, be placed in a steam crisper and toasted in the usual manner, whereupon they will be found to constitute a very pleasing, palatable and nutritious cereal food product, having very beneficial effects upon those who eat them.

It is obvious that those skilled in the art may vary the steps constituting the process, as well as the proportions of the materials employed in producing the product without departing from the spirit of the invention, and therefore I do not wish to be limited to the above disclosure except as may be required by the claims.

What I claim is:

1. The herein described new food product consisting substantially wholly of the three outermost layers of a cereal grain constituting the bran portion, a large percentage of the nitrogenous portions, and the phosphorus and potassium salts of said grain; said product retaining a portion of the natural flavor and color of said grain, substantially as described.

2. The herein described process of producing a food product which consists in subjecting to the action of boiling water only the bran and nitrogenous portions of a cereal grain; cooling the treated cereal material; producing flakes from said cooled material; and heating said flakes at temperatures and for a period sufficient to preserve a fresh flavor of said grain, substantially as described.

3. The process of producing a food product which consists in subjecting to the action of boiling water only the constituents of the three outer layers of a cereal grain for a period less than seven minutes; cooling said treated material; forming flakes from said material; and subjecting said flakes to heating actions of successively lower degrees for a period less than twenty minutes, substantially as described.

4. The process of producing a food product which consists in subjecting to the action of boiling water only the constituents of the three outer layers of a cereal grain; stirring said constituents while boiling the same; cooling said boiled material; forming said cooled material into flakes; and subjecting said flaked material to temperatures from 400° F. to 200° F. in a period of less than twenty minutes, substantially as described.

5. The process of making a food product which consists in subjecting to the action of boiling water only the bran and a portion of the nitrogenous constituents of a cereal grain and for a time sufficient to form a batter of a creamy consistency; flaking said treated materials; and subjecting said materials to temperatures between substantially 400° F. and 200° F. in less than ten minutes, substantially as described.

In testimony whereof I affix my signature.

NATHAN MININBERG.